United States Patent

[11] 3,604,303

[72] Inventor Joseph Williams
 120 East 89th St., New York, N.Y. 10028
[21] Appl. No. 835,177
[22] Filed June 20, 1969
[45] Patented Sept. 14, 1971

[54] MUSICAL COMPOSITION DEVICE
 10 Claims, 10 Drawing Figs.
[52] U.S. Cl. ................................................ 84/101,
 84/471, 84/483
[51] Int. Cl. .............................................. G10f 1/06
[50] Field of Search ........................................ 84/94–102,
 161, 166, 470, 471, 483

[56] References Cited
UNITED STATES PATENTS
2,504,632 4/1950 Blair ........................... 84/101
2,780,952 2/1957 Haricot ....................... 84/97
3,448,649 6/1969 Tobari ........................ 84/102
3,463,043 8/1969 Keir ........................... 84/470
3,476,004 11/1969 Rosen ......................... 84/97

FOREIGN PATENTS
839,428 6/1960 Great Britain ................ 84/101

Primary Examiner—Richard B. Wilkinson
Assistant Examiner—Lawrence R. Franklin
Attorney—McGlew and Toren ABSTRACT: A musical device permits visual and easy song composition and the arrangement of note actuators which may be selected for playing an infinite variety of melodies may be employed as an educational device or as a toy. The device includes a housing having a top plate with a musical staff, notes and similar musical symbols indicated thereon. The housing has an opening at its top which is aligned with the indications and which is provided for the movement of a belt therethrough. The belt carries a plurality of staff lines which align with the staff lines of the indication on the housing panel and in addition it is provided with a plurality of rows which either contain openings for receiving a note-playing peg or is provided with peg elements which may be extended to position them outwardly in the form of note playing pegs.

PATENTED SEP 14 1971 3,604,303

INVENTOR.
JOSEPH WILLIAMS
BY
McGlew & Toren
ATTORNEYS

INVENTOR.
JOSEPH WILLIAMS
BY
McGlew & Toren
ATTORNEYS

MUSICAL COMPOSITION DEVICE

SUMMARY OF THE INVENTION

This invention relates in general to musical devices, and, in particular, to a new and useful educational or toy musical device which includes a housing containing a movable belt having staff lines thereon corresponding to a musical staff indication on a panel of the housing and wherein the belt may be provided with one or more vibrating reed engaging pegs which may be positioned to contact the reeds to play a melody or song as the belt is moved.

At the present time, it is known to provide musically operated devices which include projecting tines or other note sounding elements which may be arranged to move through a path to contact fixed reed bars having vibrating elements corresponding to the notes of a musical scale. Such devices, however, operate with movable parts and with the vibrating members producing the notes arranged in a closed housing and there is no visual interrelationship between the note producing members and the actual elements which are struck thereby to produce the musical tones. In addition, such devices have been used only as automatic musical producing apparatus and not for educational purposes or for the purposes of permitting easy composition of musical scores.

The present invention is an improvement over the prior art, particularly in respect to the visual orientation of a moving member such as a belt having the note-playing devices or pegs in respect to a fixed musical staff indication contained on a panel of the housing of the device. The arrangement is such that a moving belt, for example, containing a plurality of openings for receiving note-playing pegs is aligned with the staff lines of various indicated notes arranged in a paneling of the housing. The belt is adapted to move through an opening of the housing and to advance the note-actuating pegs, which have either been extended or positioned on the belt, through a path at which they will intersect a vibrating reed member having a note sound corresponding to the peg location as indicated by the notes scale on the panel and the corresponding scale on the belt. The belt itself is arranged to extend outwardly as a continuation of the staff lines shown on a fixed panel location of the housing. In this manner the belt may be advanced either manually or by a small motor which may be timed for playoff in order to permit composition by arrangement of pegs in the belt at selected spaces along its length corresponding to the notes which are to be indicated on an ordinary musical staff. The invention thus permits an infinite variation of the note selection along the complete length of an endless belt. In the preferred arrangement the belt may be of a predetermined length and the openings for receiving the pegs or the means defining the pegs may be spaced to permit any type of note selection and musical timing in accordance with the speed of advance of the belt past the vibrating reed member.

In another embodiment of the invention, the pegs which determine the musical notes which will be played as the belt is moved may be placed in a set position to project outwardly from the belt by automatic means, for example, camming elements which are arranged across the belts and which may be set automatically for providing a given note arrangement. This setting may be done by any suitable means and for example are by automatic setting elements if desired.

Accordingly, it is an object of the invention to provide a musical device having a housing with a fixed staff line and note indication thereon with an opening through which a movable member may be advanced, the movable member containing a plurality of means which may be extended to an operating position for engaging and actuating a note-producing element disposed in the path of movement thereof, and wherein the movable member may be moved in a timed or manual manner to produce the desired composition or musical note reproduction.

A further object of the invention is to provide a musical device which includes an endless belt having a plurality of spaces defined across its width and along its length which may accommodate for example, an insertable peg member for which may contain an extendable peg member, the peg members being oriented so that when they are in an actuated position they will engage a note-producing element which is oriented to correspond to the note staff line orientation of the peg on the belt.

A further object is to provide a toy device or a musical composition device which includes a movable member having staff lines indicated thereon which may be correlated with fixed note indications and which includes means associated therewith which may be actuated to play a musical note as the member is moved in association with the plurality of fixed musical note producing elements.

A further object of the invention is to provide an educational or toy device which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
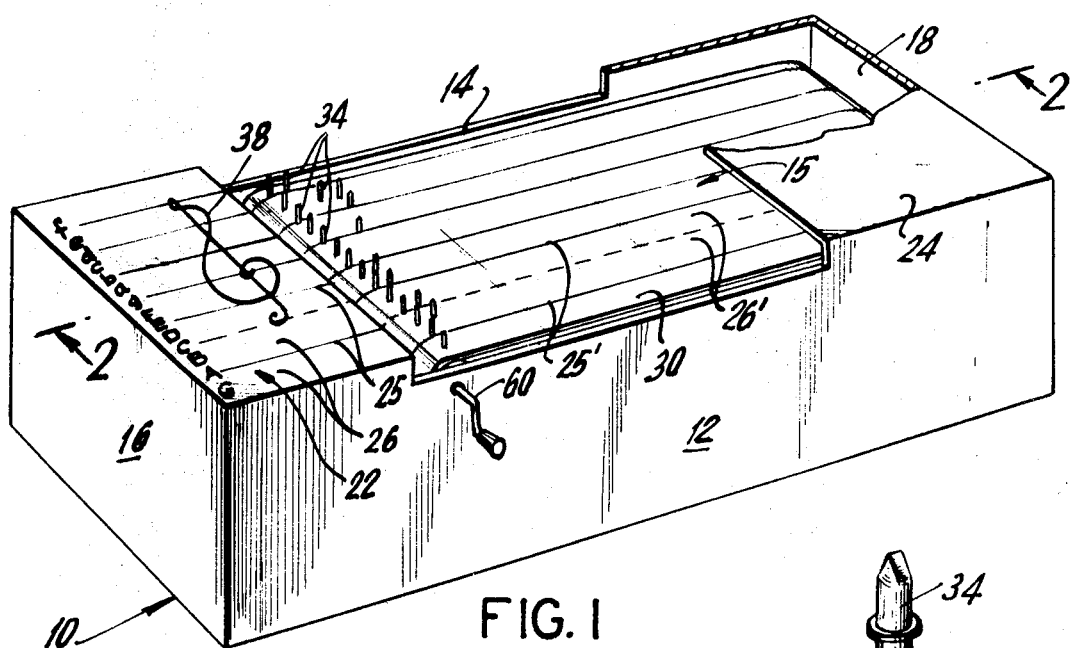
FIG. 1 is a top perspective view of a musical composition device or toy constructed in accordance with the invention.
Figure 4:
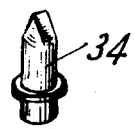
FIG. 4 is a perspective view of an insertable note actuating plug.
Figure 2:
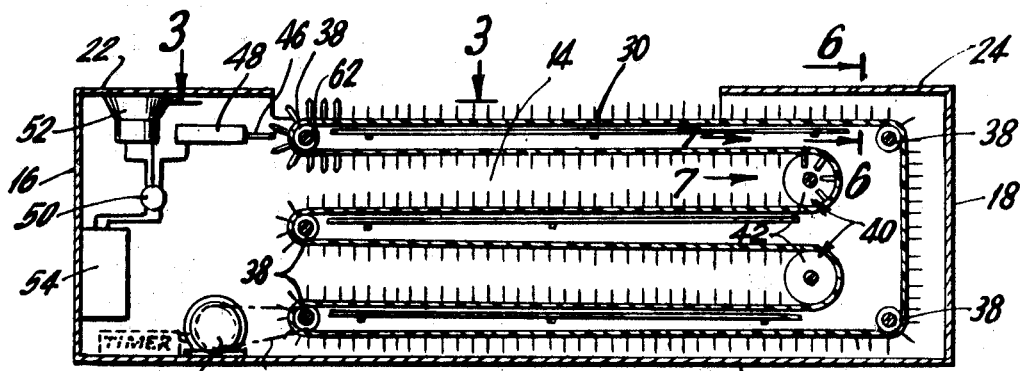
FIG. 2 is a section taken along the line 2—2 of FIG. 1.
Figure 3:
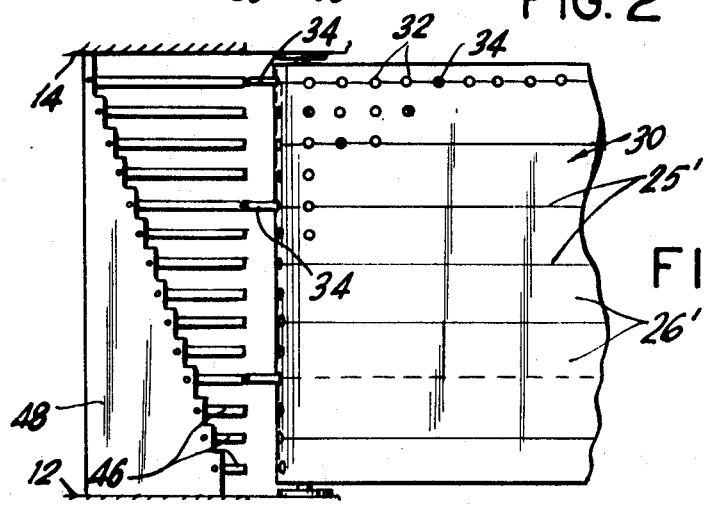
FIG. 3 is a section taken along the line 3—3 of FIG. 2.

Referring to the drawings in particular the invention embodied therein in FIGS. 1 to 7 comprises a housing generally designated 10 having sidewalls 12 and 14, end walls 16 and 18, bottom wall 20, and top partial panels 22 and 24. The sidewalls 12 and 14 are notched and this notch area and the space area between the top panels 22 and 24 defines a viewing opening or work area 15 for facilitating musical composition or musical note arrangement.

In accordance with the preferred embodiment of the invention the panel 22 is provided with a plurality of musical staff lines 25 which are indicated by the note designations A, C, E, g, b, d, f. In addition, it is provided with spaces 26 which are indicated with the musical designations G, B, D, F, a, c, e. Other suitable musical indicators such as a G clef 28 are also provided on this panel. A feature of the arrangement of the invention is that a movable member such as an endless belt 30 is aligned in the viewing area in a position at which musical composition may be carried out on the belt by a suitable actuation or marking of the belt.

In accordance with a further feature of the invention the belt 30 is provided in the embodiment of FIGS. 1 to 7 with a plurality of rows of openings 32. The openings 32 are of a size to accommodate peg note actuator 34 which may be inserted into selected ones of the rows of openings 32 which extending both longitudinally and transversely over the surface of the belt. The belt 30 is also provided with staff lines 25' which corresponds to the staff line indications on the panel 22 and staff spaces 26' which correspond to the staff spaces 26 which are shown on the top panel 22 and the holes 32 are located both on the lines 25' and the spaces 26'. With such an arrangement a composer or a child or other who is learning may insert notes on the staff formation formed by the belt 30 in accordance with the numbers of plugs 34 he applies or actuates.

Figure 5:
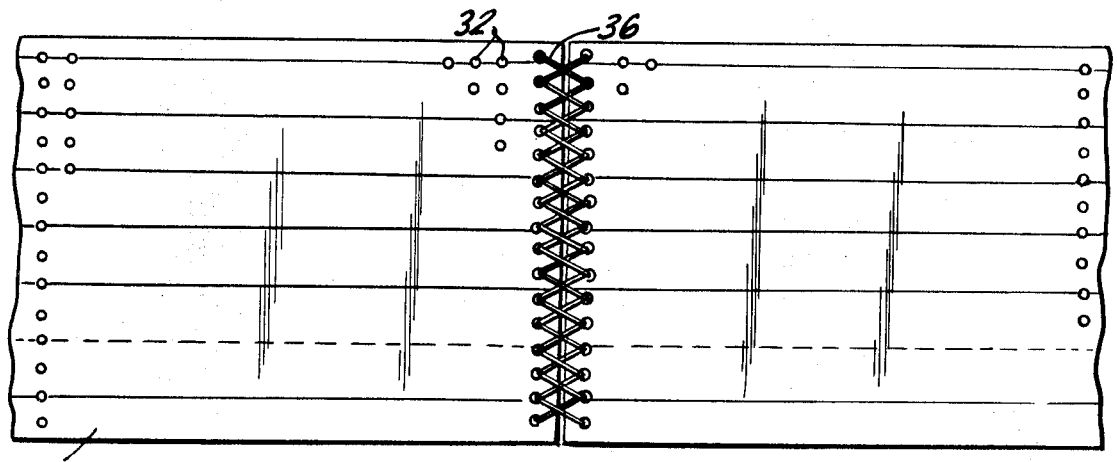
FIG. 5 is a top plan view of the endless belt.
Figure 6:
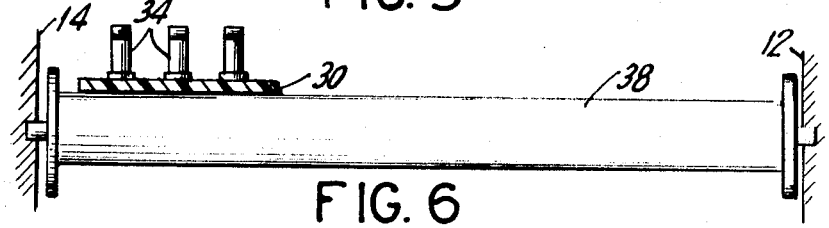
FIG. 6 is a section taken along the line 6—6 of FIG. 2.
Figure 7:
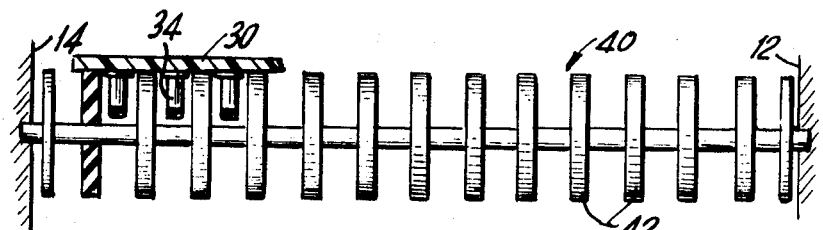
FIG. 7 is a section taken along the line 7—7 of FIG. 2.

The belt 30 is made in endless form and has its ends held together, for example, by nylon, cord, lacing 36 as indicated in FIG. 5. A plastic belt of 96 inches in length and 5½ inches in width is advantageously employed and it is guided over a plurality of guide rollers 38 and orientation rollers 40. The orientation rollers include spaced disks 42 (FIG. 7) between which the plugs will become oriented when the belt 30 is directed thereover.

The upper reach of the belt 30 moves downwardly adjacent the top indicator panel 22 to cause the note actuators 34 to engage an appropriate note sounding or actuating element 46 which in the embodiment illustrated comprises a reed corresponding to each note indicated on the panel 24 and mounted on a reed bar 48. The elements 46, however, may comprise for example, electrical switches which may be connected to suitable means for actuating one or more notes or note combinations.

The note-sounding elements or reeds 46 are connected to an amplifier 50 which in turn is connected to a speaker 52. A battery holder 54 is mounted in a position for providing an electrical current to the circuit including the amplifier, speaker and vibrators.

In the embodiment illustrated the belt 30 is 96 inches long and 5½ inches wide and includes holes of one-eighth of an inch diameter which are arranged at three-eighths of an inch apart. 14 holes are provided across the belt which correspond to notes which may be in the lines and spaces indicated on the panel 22 and 256 holes are located along the length of the belt. In this embodiment the belt is driven through a connecting chain or belt drive 56 to a lower one of the rollers 38 and which is driven by a small electric motor 58. One rotation of the belt may be carried out every 3 minutes so that the holes provided for the note actuators 34 would be such that each hole comprises one-eighth note. If a quarter note is to be indicated then a peg is positioned in a hole and the next hole proceeding in a longitudinal direction of the belt is left open. If a note with a dot thereafter is indicated this is composed by having a single peg in a hole followed by the next two holes which are left vacant. A similar arrangement may be made throughout the length of the belt to permit the defining of a complete musical score. The device may also be operated manually through a crank 60 which is connected to a shaft 62 for a top roller 38.

Figure 8:
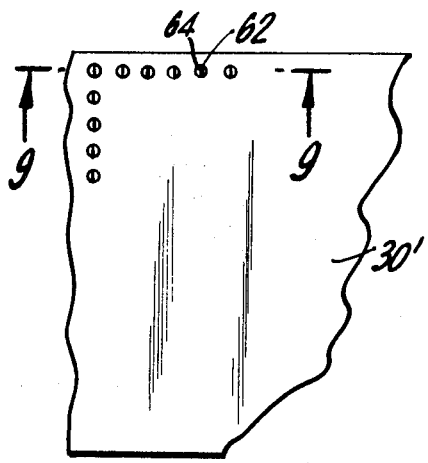
FIG. 8 is a partial top plan view of another embodiment of belt.
Figure 9:
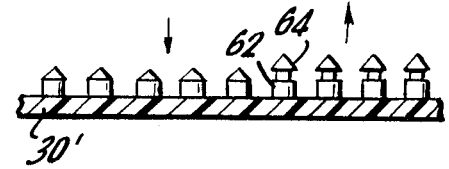
FIG. 9 is a section taken along the line 9—9 of FIG. 8.

In the embodiment illustrated in FIGS. 8 and 9, there is provided a belt 30' which includes a plurality of cylindrical projections 62 or note locaters which accommodate note actuators or plugs 64 which may be pulled outwardly to an actuated position as indicated in FIG. 9. In the actuated position they extend outwardly far enough so that they contact one of the note-sounding elements 46.

Figure 10:
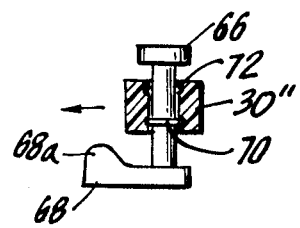
FIG. 10 is a partial sectional and partial elevational view of a camming arrangement for placing the note-actuating members in an operative position in accordance with another embodiment of the invention.

In FIG. 10, there is illustrated an arrangement for presetting note actuators or plugs 66 which carried on a belt 30''. In this embodiment a cam member or note setting device 68 is disposed in the path of movement of the belt 30'' and it includes cam elements 68a which effect the presetting of those plugs 66 which are to be actuated. This is done by causing the plug 66 to move upwardly and cause a resilient ring 70 thereon to move into a recess 72 defined at the upper end of the belt 30''.

What is claimed is:

1. A musical device for composing a score and for playing the selected notes, comprising a housing having a top wall with a panel with a musical staff indication thereon and a top opening alongside said panel, a note-sounding means on said housing including a plurality of separately actuatable vibratable elements arranged in a spaced relationship which corresponds to the space relationship of the notes which may be indicated on the musical staff, a note actuator support belt carried on said housing and having a plurality of actuator positions defined across the width and along the length thereof, said positions being located in a plurality of longitudinal rows representing notes of a scale corresponding to the spaces and the lines of said staff indication, a separate note actuator adapted to be carried in selected positions on said actuator support belt and which may be positioned to project from said support belt and to engage a note-sounding element aligned therewith, guide means in said housing for guiding said belt so that a portion thereof is always presented in said opening with the actuator positions being parallely aligned with positions of said staff corresponding to the notes of a scale and being visible in said opening, and means for moving said belt relative to said note-sounding elements and parallel to said musical staff indicator whereby those of the actuators which project from said support member engage a respective sounding element aligned therewith to produce a corresponding note sound.

2. A musical device, according to claim 1, including means driving said note actuator support member at a rate to move said note actuator support member to engage the projecting ones of said note actuators with said note-sounding elements in accordance with the musical score time selected.

3. A musical device, according to claim 2, including an electric motor connected to said support member, said support member comprising an endless belt.

4. A musical device, according to claim 1, including hand crank means connected to said note actuator support member for moving said support member.

5. A musical device according to claim 1, wherein said note-sounding elements comprises a plurality of vibrating reeds, said reeds being located in a position and a spacing corresponding to the position and spacing of the lines and spaces of said staff indication on said panel.

6. A musical device according to claim 1, including a reed bar mounted below said panel, a plurality of spaced reed elements projecting outwardly from said reed bar and comprising said note-sounding elements, said reed elements being located below and in corresponding alignment with the lines and spaces of said staff indication.

7. A musical device, according to claim 6, including electrical amplification means connected to said reed elements for amplifying the sound produced by contact with said note actuator part.

8. A musical device, according to claim 1, including means arranged adjacent said actuator support member for contacting said note actuator and positioning it to project from said support member in active operative position.

9. A musical device, according to claim 1, wherein said belt positions comprise a plurality of holes in said belt located in alignment with the respective lines and spaces of said staff indication, said separate note actuator comprising a plug adapted to be inserted into a selected opening of said belt and to project above said belt.

10. A musical device, comprising a housing having a panel with a musical staff indication thereon, note-sounding means on said housing including a plurality of separately actuatable note-sounding elements arranged in a spaced relationship which corresponds to the space relationship of the notes which may be indicated on the musical staff, a note actuator support member carried on said housing and having a plurality of note locater elements arranged across the width and along the length thereof, said elements extending in a plurality of longitudinal rows corresponding to the spaces of lines of said staff indication, a separate note actuator adapted to be carried on said actuator support member and which may be positioned to project from said support member to engage a note-sounding element aligned therewith, and means for moving said note actuator support members relative to said note-sounding elements whereby those of the actuators which project from said support member engage a respective sounding element aligned therewith to produce a corresponding note sound, said note actuator support member comprises an endless belt, said actuator comprising a plurality of cylindrical members mounted on said belt comprising said note locator elements, and a member displaceable within each of said cylindrical members for movement between an actuating projecting position to an inactive retracted position.